United States Patent
Carroll et al.

(10) Patent No.: US 11,869,035 B1
(45) Date of Patent: *Jan. 9, 2024

(54) SYSTEMS AND METHODS FOR DISTRIBUTING ADVERTISEMENTS

(71) Applicant: AMERICAN EXPRESS TRAVEL RELATED SERVICES COMPANY, INC., New York, NY (US)

(72) Inventors: Jonathan J. Carroll, Phoenix, AZ (US); Hans-Jurgen Greiner, Desert Hills, AZ (US); Padmaja Kodavanti, Phoenix, AZ (US); Gopinath Kondapally, Phoenix, AZ (US); Kevin H. Ringger, Surprise, AZ (US); James Jerome Smart-Foster, Phoenix, AZ (US); Arun Swamy, Aurora, IL (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 123 days.

This patent is subject to a terminal disclaimer.

(21) Appl. No.: 16/746,359

(22) Filed: Jan. 17, 2020

Related U.S. Application Data

(63) Continuation of application No. 14/335,618, filed on Jul. 18, 2014, now Pat. No. 10,540,685.

(51) Int. Cl.
*G06Q 30/0251* (2023.01)
*G06Q 50/00* (2012.01)
*G06Q 30/0241* (2023.01)

(52) U.S. Cl.
CPC ..... *G06Q 30/0253* (2013.01); *G06Q 30/0255* (2013.01); *G06Q 30/0277* (2013.01); *G06Q 50/01* (2013.01); *G06Q 30/0259* (2013.01); *G06Q 30/0261* (2013.01)

(58) Field of Classification Search
CPC .......... G06Q 30/0259; G06Q 30/0253; G06Q 50/01; G06Q 30/0255; G06Q 30/0277; G06Q 30/0261; H04L 63/1441
See application file for complete search history.

(56) References Cited

U.S. PATENT DOCUMENTS

| | | | |
|---|---|---|---|
| 8,825,759 B1 | 9/2014 | Jackson et al. | |
| 2005/0198692 A1* | 9/2005 | Zurko | G06F 21/563 726/24 |
| 2000/0030644 | 2/2010 | Dhamodharan | |
| 2010/0030644 A1 | 2/2010 | Dhamodharan | |

(Continued)

OTHER PUBLICATIONS

HTML5 Security Cheatsheet. As recorded by Internet Archive on Apr. 4, 2012. (Year: 2012).

(Continued)

*Primary Examiner* — Mario C. Iosif
(74) *Attorney, Agent, or Firm* — Thomas | Horstemeyer, LLP

(57) ABSTRACT

An advertisement distribution system, method, and computer readable medium (collectively, the "System") is provided. The System may request posts containing a subject tag from social media operators. The posts may be made by merchants having a relationship with the System. The System may filter the posts based on filters, geographic data, and member preferences. The System may distribute the posts to members having a relationship with the System.

16 Claims, 6 Drawing Sheets

(56) References Cited

U.S. PATENT DOCUMENTS

| | | | |
|---|---|---|---|
| 2010/0075638 A1 | 3/2010 | Carlson et al. | |
| 2010/0083124 A1* | 4/2010 | Druzgalski | G06F 16/9537 |
| | | | 715/738 |
| 2010/0106577 A1* | 4/2010 | Grimes | G06Q 30/02 |
| | | | 705/14.15 |
| 2010/0114677 A1* | 5/2010 | Carlson | G06Q 40/02 |
| | | | 705/14.1 |
| 2011/0119133 A1 | 5/2011 | Igelman et al. | |
| 2012/0166267 A1 | 6/2012 | Beatty et al. | |
| 2012/0271691 A1* | 10/2012 | Hammad | G06Q 30/02 |
| | | | 705/14.17 |
| 2013/0060637 A1 | 3/2013 | Walker et al. | |
| 2013/0238413 A1* | 9/2013 | Carlson | G06Q 20/384 |
| | | | 705/14.25 |
| 2014/0278865 A1* | 9/2014 | Kumar | G06Q 50/01 |
| | | | 705/14.16 |
| 2014/0279184 A1 | 9/2014 | Lai et al. | |
| 2014/0283139 A1* | 9/2014 | Anand | G06F 21/54 |
| | | | 726/30 |
| 2015/0066632 A1 | 3/2015 | Gonzalez et al. | |
| 2015/0127452 A1 | 5/2015 | Feldman | |
| 2015/0281307 A1* | 10/2015 | Hartwell | H04N 21/812 |
| | | | 709/219 |
| 2018/0300745 A1* | 10/2018 | Aubespin | G06Q 30/0241 |

OTHER PUBLICATIONS

OWASP, XSS (Cross Site Scripting) Prevention Cheat Sheet. As recorded by Internet Archive on Mar. 15, 2012. (Year: 2012).

* cited by examiner

SYSTEMS AND METHODS FOR DISTRIBUTING ADVERTISEMENTS

CROSS-REFERENCE TO RELATED APPLICATION

This application is a continuation of U.S. patent application Ser. No. 14/335,618, entitled "SYSTEMS AND METHODS FOR DISTRIBUTING ADVERTISEMENTS" and filed on Jul. 18, 2014, which is incorporated by reference as if set forth herein in its entirety.

FIELD

The present disclosure relates to systems and methods for distributing advertisements, and more specifically, to systems and methods for distributing advertisements using social media.

BACKGROUND

Merchants often use digital media in order to inform consumers about the merchants' items (e.g., goods and services). For example, a merchant may send an email to consumers about a sale or anew item being offered by a merchant. However, a merchant may be unable to send emails to consumers who have not previously provided their email address to the merchant, or consumers may be overwhelmed by emails coming from a large number of merchants. Moreover, small merchants may not have the resources to participate in large scale marketing in which promotions are sent to potential consumers.

Many merchants also advertise through the merchants' social media accounts. However, many consumers may not visit a merchant's social media page, and thus may be unaware of the merchant's social media posts.

SUMMARY

A system, method, and computer readable medium configured for distributing advertisements are disclosed. The method may include requesting posts containing a subject tag from a social media operator. A plurality of posts containing the subject tag may be received from the social media operator. The plurality of posts may be filtered with a profanity filter. The method may include determining that a post in the plurality of posts was made by a merchant having a relationship with the computer-based system. The system may determine that the post complies with preferences of a member. The post may be distributed to the member.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods are disclosed herein for distributing advertisements. A merchant may post to a social media account page of the merchant. The post may include a subject tag indicating that an advertisement distributor should further distribute the post. The advertisement distributor may request from the social media operator posts that contain the subject tag. The advertisement distributor may filter the posts for profanity, geographic location, and member preferences. The advertisement distributor may transmit the post to members having an association with the advertisement distributor. Thus, the advertisement distributor may assist merchants in reaching members.

Figure 1:
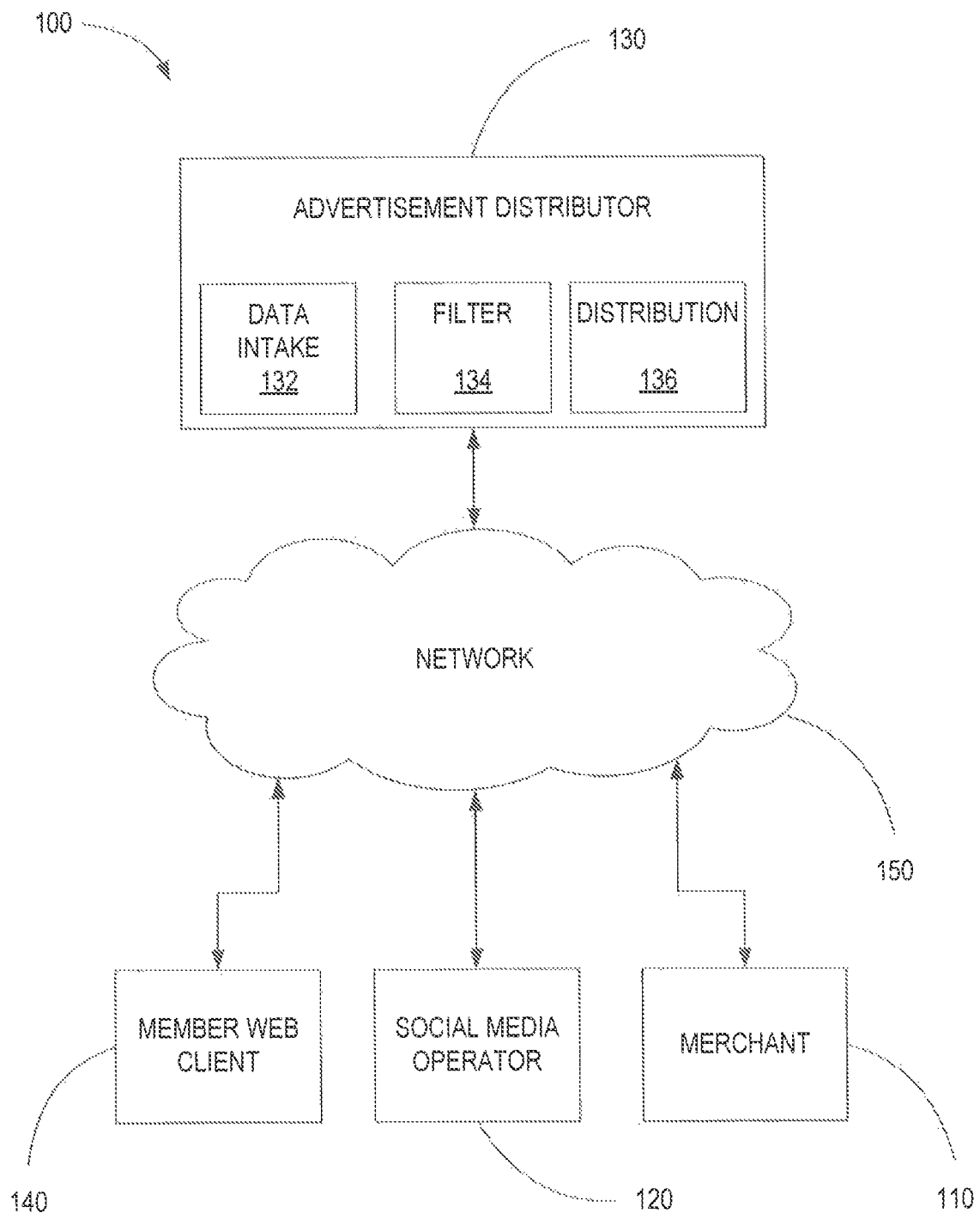
FIG. 1 illustrates a block diagram illustrating various system components of an advertisement distribution system, in accordance with various embodiments.

Referring to FIG. 1, a system for distributing advertisements is illustrated according to various embodiments. System 100 may comprise a merchant 110, asocial media operator 120, an advertisement distributor 130, and a member web client 140. Merchant 110, social media operator 120, advertisement distributor 130, and member web client 140 may communicate via a network 150.

Merchant 110 may comprise any person, entity, distributor system, software, and/or hardware that is a provider, broker and/or any other entity in the distribution chain of items. For example, a merchant may be a grocery store, a retail store, a travel agency, a service provider, an on-line merchant or the like. Phrases and terms similar to "business" or "merchant" may be used interchangeably with each other.

Social media operator 120 may comprise any service which allows users to post data, such as FACEBOOK®, TWITTER® or MYSPACE®. Social media operator 120 may comprise any combination of hardware or software. Social media operator 120 may allow users to post data accompanied by a subject tag. In various embodiments, the subject tag may be indicated by a special character, such as a hashtag (#). For example, a user wishing to post about a particular event they attended may post "Had a great time. #particularevent," Users or distributors may be able to search for any posts containing the subject tag.

Advertisement distributor 130 may comprise any combination of hardware or software which interacts with network 150. Advertisement distributor 130 may comprise a data intake module 132, a filter module 134, and a distribution module 136. In various embodiments, advertisement distributor 130 may be operated by or affiliated with a transaction account issuer.

Data intake module 132 may receive data relating to posts on social media operator 120. In various embodiments, data intake module 132 may be configured to crawl posts on social media operator 120. Data intake module 132 may also be configured to receive posts from social media operator 120. Data intake module 132 may communicate with social media operator 120 via an application programming interface ("API"). In various embodiments, data intake module 132 may only receive posts containing particular subject tags.

Filter module 134 may be configured to filter the posts obtained by data intake module 132. Filter module 134 may filter the posts by any suitable criteria. For example, filter module 134 may filter posts based on geographic area of merchant, geographic area of a consumer, subject, offer type (e.g. discount, new product, etc.), consumer preferences, merchant type, removal of profane posts, posts from registered merchants, etc. Such criteria may be included in the metadata associated with the post or may be obtained based on a service establishment number of the merchant 110.

Distribution module 136 may be configured to distribute posts to consumers. Posts may be distributed to consumers via a variety of platforms. For example, posts may be distributed to consumers within a social media feed, by email, by regular mail, within an individual financial account page, within an online financial account webpage, etc.

A member may interact with network 150 via a member web client 140. A member may be any entity having a relationship with the advertisement distributor 130. In various embodiments, the advertisement distributor may be affiliated with a transaction account issuer. Members may include merchants that accept payment from the transaction account issuer and/or consumers having a transaction account issued by the transaction account issuer. A member may not need to be "registered" or formally affiliated, but can include any web client, consumer and/or merchant. In various embodiments, a first merchant may post to social media operator 120, and a second merchant may be a member that receives the post.

A web client includes any device (e.g., personal computer) which communicates via any network, for example such as those discussed herein. Web clients may include a browser application which interfaces with network 150. Such browser applications comprise Internet browsing software installed within a computing unit or a system to conduct online transactions and/or communications. These computing units or systems may take the form of a computer or set of computers, although other types of computing units or systems may be used, including smartphones, laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer®, Mozilla Firefox®, Google® Chrome, Apple® Safari, iOS, Android, or any other of the myriad software packages available for browsing the internet.

Figure 2:
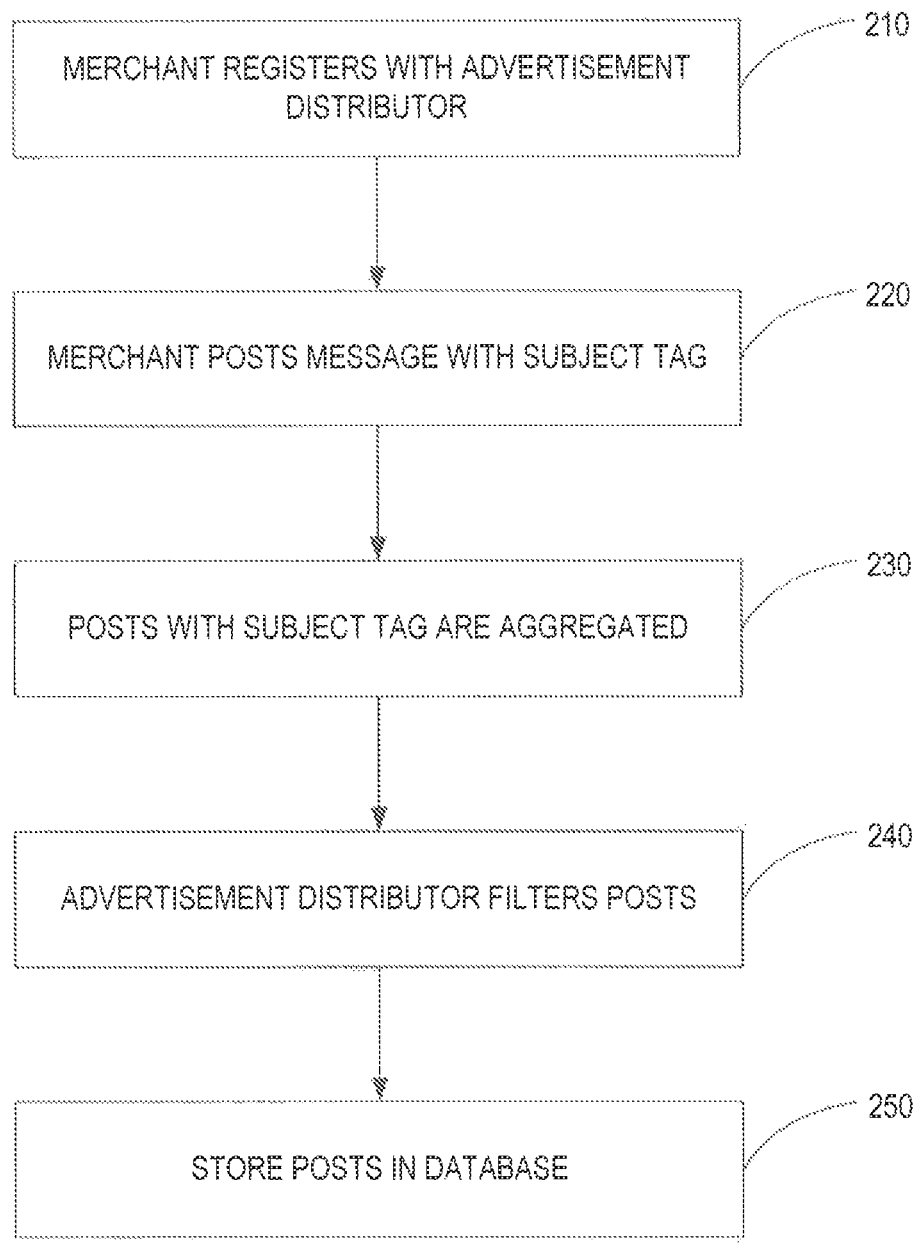
FIG. 2 illustrates a process flow for obtaining posts, in accordance with various embodiments.

Referring to FIG. 2, a process for obtaining posts is illustrated according to various embodiments. A merchant may register with the advertisement distributor (step 210). In various embodiments, the merchant may have a prior affiliation with the advertisement distributor and/or a registration may not be necessary. For example, the advertisement distributor may be operated by a transaction account issuer, and the merchant may accept payments from transaction accounts issued by the transaction account issuer. The merchant may provide the advertisement distributor with information about the merchant, such as merchant name, address, service establishment number, and social media name or handle (e.g. "@-merchant"). The advertisement distributor may provide the merchant with a confirmation that includes information such as best practices, terms and conditions, and instructions. The instructions may include informing the merchant how to add an expiration date to posts. In various embodiments, the advertisement distributor may request to follow a social media account of the merchant, and the merchant may approve the advertisement distributor's request.

A merchant may post a message with a subject tag to a social media page (step 220). The merchant may select the subject tag based on a desired distribution group. For example, the merchant may use a subject tag "#distributorpush" to push the post to all members of an advertisement distributor. In various embodiments, the merchant may use a subject tag "#distributormerchantpush" to push the post to all merchants that are members of the advertisement distributor. Any number of subject tags may be used to indicate certain subsets of members of the advertisement distributor.

Posts containing the subject tag may be aggregated (step 230). The advertisement distributor may transmit a request to the social media operator for posts containing the subject tag. The social media operator may search a database of posts tor all posts containing the subject tag. The social media operator may transmit a response to the advertisement distributor containing the posts containing the subject tag. The advertisement distributor may eliminate posts by anyone other than merchants registered with the advertisement distributor. In various embodiments, the advertisement distributor may follow a social media account of the merchant, and the advertisement distributor may filter the merchant's posts to eliminate posts not containing the subject tag.

Advertisement distributor may obtain posts from a variety of merchants and social media operators. For example, MERCHANT A may make a post with the subject tag on TWITTER®, and MERCHANT B may make a post with the subject tag on FACEBOOK®. The advertisement distributor may obtain the posts from both social media operators and store the posts containing the subject tag from both merchants in a database. In various embodiments, a single merchant may make identical posts on multiple social media operators. Advertisement distributor may delete identical posts in order to prevent duplicative posts being presented to members.

Advertisement distributor may filter the posts (step 240). In various embodiments, advertisement distributor may perform a first level profanity filter comprising a word search query to eliminate posts containing any obscene language. Advertisement distributor may perform a second level profanity filter by reviewing the posts for inappropriate content which may have passed through the first level profanity filter, such as "I do not like the advertisement distributor #distributorpush." In various embodiments, advertisement distributor may utilize any filter to restrict or eliminate unwanted or potentially problematic posts. For example, advertisement distributor may utilize a cross-site scripting ("XSS") filter which may sanitize posts containing JavaScript such that the JavaScript cannot be executed in order to prevent digital attacks.

Advertisement distributor may store the sanitized posts in a database (step 250). The database may contain posts which have been created by merchants registered with advertisement distributor and filtered through the profanity filters and XSS filter. The posts may be deemed ready for distribution to members. In various embodiments, the posts may be associated with metadata about the posts. The metadata may include an expiration date. A merchant may select an expiration data for a post. For example, a merchant may indicate that a post is only valid for one hour, one day, or any suitable length of time. A default expiration date may be assigned by the advertisement distributor (e.g., absent an expiration date selected by the merchant). In various embodiments, the advertisement distributor may assign a default expiration date of one week, or any other suitable length of time. The merchant may delete posts individually, and the posts may be removed from distribution.

In various embodiments, the metadata may include geographic information. For example, the post may be associated with an address of the merchant. The post may be distributed to members within a specified distance of the merchant, such as within a five mile radius of the merchant. The merchant may select a radius in which the post should be distributed to members.

Figure 3:
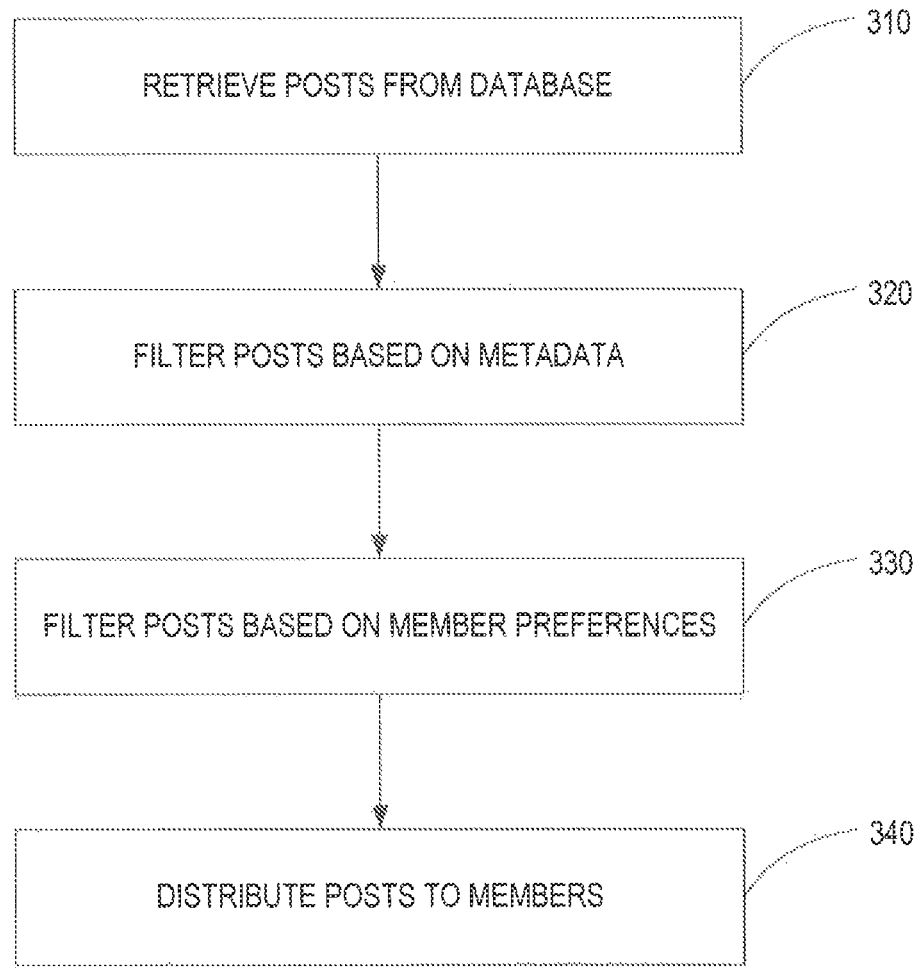
FIG. 3 illustrates a process flow for distributing posts, in accordance with various embodiments.

Referring to FIG. 3, a process for distributing advertisements is illustrated according to various embodiments. An advertisement distributor may retrieve a post from a database (step 310). The post may be stored in the database as discussed with reference to FIG. 2. The advertisement distributor may identify a subject tag in the post. Based on the subject tag, the advertisement distributor may identify a group to receive the post. For example, a subject tag "#distributorpush" may apply to all members registered with the advertisement distributor, or a subject tag "#distributormerchantpush" may apply to all merchants that are registered with the advertisement distributor.

The advertisement distributor may filter the posts based on metadata associated with the posts (step 320) or information about members obtained from any database (e.g., transaction account issuer database). For example, the advertisement distributor may determine that a post is associated with a merchant in a particular geographic area, and the advertisement distributor may compare the geographic area of the merchant with a geographic area of members. The advertisement distributor may select members within a specified distance of the merchant to receive the post. A geographic location of a member may be determined based on a residential address of the member, a billing address of the member, a merchant address of the member, a device location of the member (e.g. a cell phone location), or any other relevant locational data. In various embodiments, a member may opt-in or opt-out of location data associated with a device.

The advertisement distributor may filter the posts based on member preferences or member profiles (step 330). A member may select posts which the member prefers to receive or not receive. For example, a member may prefer to receive posts related to certain industry categories, such as restaurants, sporting goods, travel, leisure, etc. Additionally, a member may prefer to receive posts based on an offer type, such as discount, new products, grand opening, sale, etc. A member may set preferences to receive posts within a geographic area defined by the member, such as city, state, distance from member, etc. Thus, a member may receive posts customized to the particular member.

The advertisement distributor may transmit the customized posts to the member (step 340). The posts may be transmitted to the member via a variety of platforms. In various embodiments, and as further described with reference to FIG. 4, the posts may be displayed within a transaction account webpage of the member. In various embodiments, and as further described with reference to FIG. 5, the posts may be displayed within an application affiliated with the advertisement distributor. The posts may also be distributed to members via email, SMS message, mail, or any other suitable distribution method.

Once the member receives the post, the member may read the post and decide to shop at a merchant or utilize the deal in the post, as a result of the post. In various embodiments, the member may display the post to the merchant or otherwise inform the merchant of the post in order to receive a promotion in the post. Thus, the advertisement distributor may facilitate a promotion between a merchant and a consumer without the advertisement distributor taking part in the financial transaction. However, in various embodiments, the advertisement distributor may be associated with a transaction account issuer, and the transaction account issuer may automatically apply a discount to a transaction account of the member in response to the member making a transaction covered by the post. For example, a merchant may post "10% off all purchases today with your DISTRIBUTOR card #distributorpush," and the transaction account issuer may apply a discount to the billing statement of the member for any purchases made with the merchant that day (e.g., using a particular transaction account). The transaction account issuer may also overlay other promotions or reward programs over the posted promotion, so that the reward programs operate together, sequentially, etc.

Figure 4A:
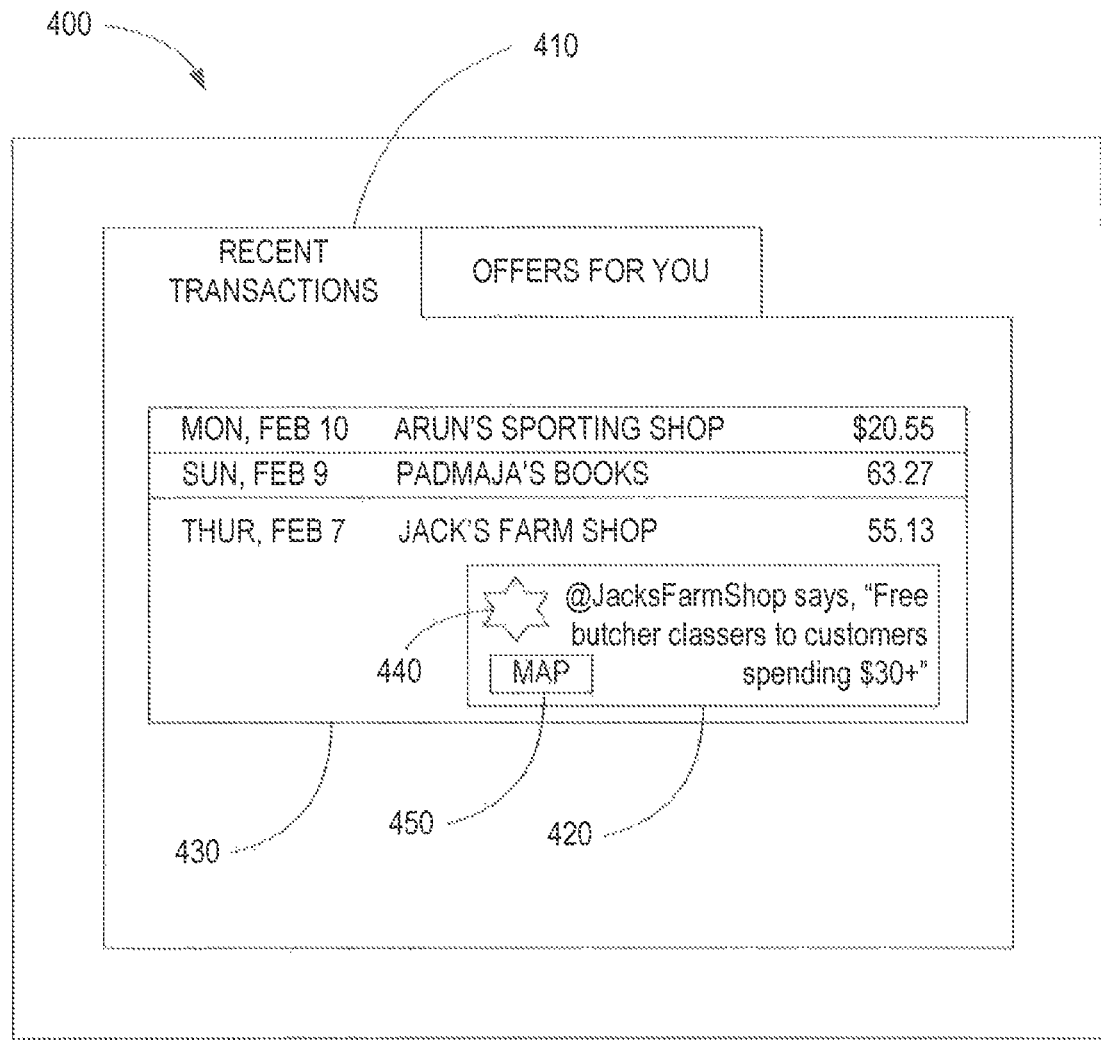
FIG. 4A illustrates a screen shot of a transaction account page, in accordance with various embodiments.

Referring to FIG. 4A, a screenshot 400 of a transaction account page is illustrated according to various embodiments. A transaction account holder may have a transaction account associated with the advertisement distributor. The transaction account page may display recent transactions 410 for the transaction account. The advertisement distributor may determine that a post 420 should be distributed to the transaction account holder. The post 420 may be displayed adjacent to or as part of a recent transaction. In various embodiments, a post from a merchant may be displayed next to a transaction with the merchant. For example, transaction 430 shows a transaction with Jack's Farm Shop. Jack's Farm Shop may make a post on a social media site, and the advertisement distributor may display the post to the transaction account holder next to the transaction 430. In various embodiments, the advertisement distributor may display a post from a merchant next to a transaction with a merchant in the same industry as the merchant making the post, such as a competitor of the merchant.

The post may display an icon 440 indicating which social media operator the merchant used to make the post. The post may display a link 450 to view the merchant on a map. The member may click on the map link, and a map may be displayed to the member.

Figure 4B:
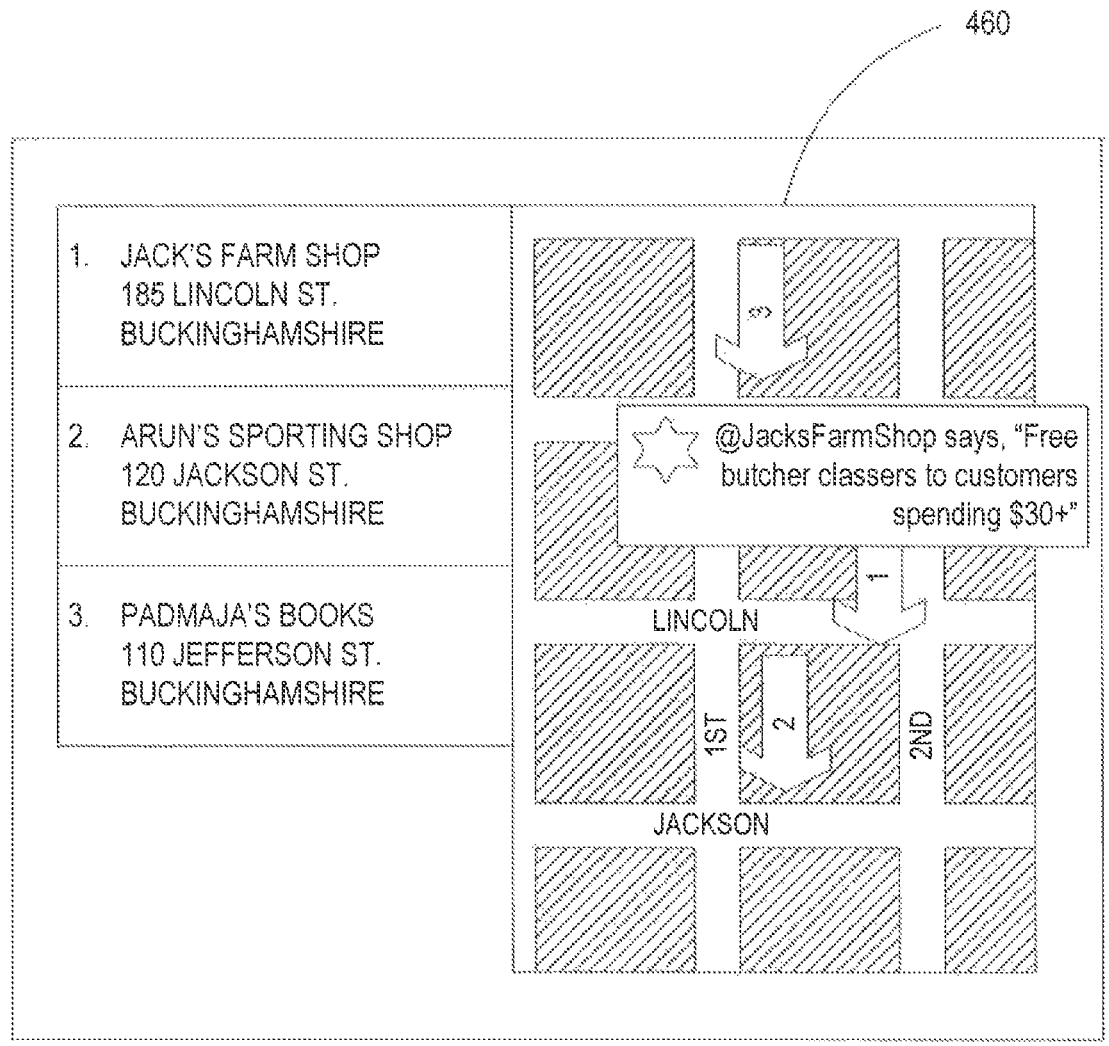
FIG. 4B illustrates a screen shot of a map showing merchant locations according to various embodiments.

Referring to FIG. 4B, a map 460 displaying member merchants is illustrated according to various embodiments. A transaction account holder may click on a map link as described with reference to FIG. 4A. The map 460 may display a location of the merchant in a post. The map may also display locations of other merchants having an affiliation with the advertisement distributor.

Figure 5:
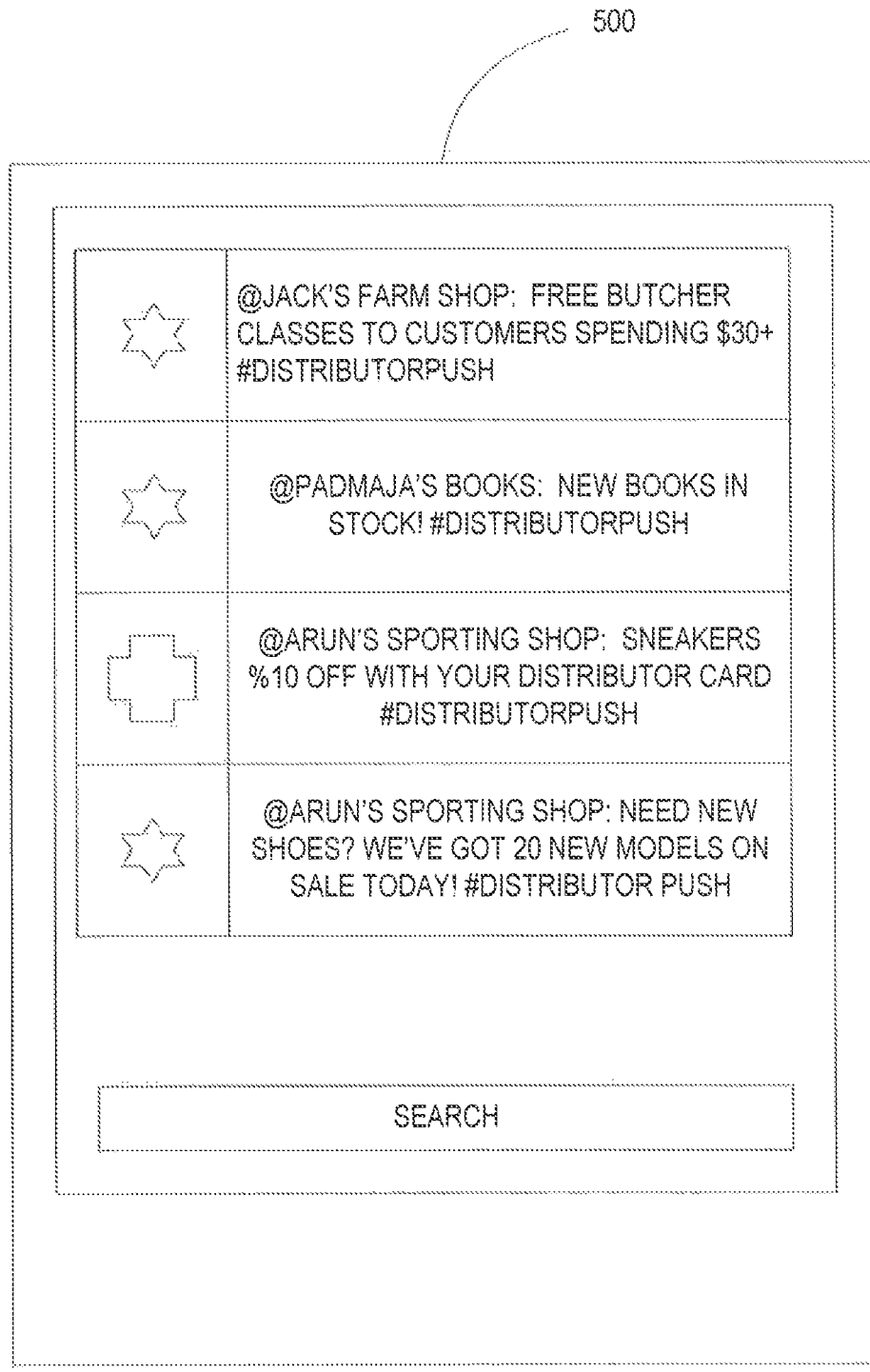
FIG. 5 illustrates a screen shot of a distributor application, in accordance with various embodiments.

Referring to FIG. 5, a screenshot 500 of a distributor application is illustrated according to various embodiments. The distributor application may allow communication between members of the advertisement distributor, and may distribute offers to members of the advertisement distributor. The distributor application may allow merchants to make posts which may be distributed to other members. In various embodiments, the posts may be displayed in a feed, as shown in FIG. 5. The posts may be organized by time posted, with the most recent posts listed first. A member may search for posts by typing a merchant name, location, industry, or any other information. Related posts may be displayed to the member. The member may view the posts on a map. In response to a member moving to an area encompassing a merchant, the member may receive an alert regarding a post from the merchant.

Although described primarily with reference to a transaction account issuer, the advertisement distributor may be any entity which connects merchants with customers. The advertisement distributor may provide merchants with seamless integration with customers by allowing merchants to post messages on social media accounts, along with obtaining the messages and distributing the messages to customers and other merchants.

Phrases similar to a "payment processor" may include a company (e.g., a third party) appointed (e.g., by a merchant) to handle transactions. A payment processor may include an issuer, acquirer, authorizer, network and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The phrases consumer, customer, user, account holder, account affiliate, cardmember or the like shall include any person, entity, business, government organization, business, software, hardware, or machine associated with a transaction account, that buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000" The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier ("RFID"), a biometric, and the like.

The system may include or interface with any of the foregoing accounts, devices, and/or a transponder and reader (e.g. RFID reader) in RF communication with the transponder (which may include a fob, or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, tender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as determining or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as random access memory (RAM), and may also include a secondary memory. The secondary memory may include, for example, a hard disk drive and/or a removable, storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system;

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-14S/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by a one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PIP, PKI, GPO (GnuPO), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and art IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods am well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or extremal systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the terms "end user", "consumer", "customer", "cardmember", "business", "merchant", or "member" may be used interchangeably with each other, and each may include any person, entity, government organization, business, machine, hardware, and/or software. In various embodiments, the functions described with reference to these terms may be performed by any entity in system 100.

A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network may be a closed network that is assumed to be secure from eavesdroppers. Exemplary transaction networks may include the American Express®, VisaNet® and the Veriphonet® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity.

In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become mole pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method comprising:
    obtaining, by a computer-based system, a plurality of posts associated with a merchant from a first social media operator and a second social media operator;
    identifying, by the computer-based system, a request to distribute a social media post from the plurality of posts to a recipient group based at least in part on the social media post comprising a subject tag for the merchant, the social media post having been published by the first social media operator or the second social media operator;
    filtering, by the computer-based system, a subset of the posts from the plurality of posts according to a common preference in response to the request to distribute the social media post;
    deleting, by the computer-based system, a first duplicative post with the subject tag from the subset of the posts based at least in part on the first duplicative post being received from the first social media operator and a second duplicative post with the subject tag being received from the second social media operator;
    identifying, by the computer-based system, a set of recipients for the recipient group, wherein individual recipients in the set of recipients share the common preference;
    disabling, by the computer-based system, malicious executable scripting code embedded in a particular post in the subset of the posts by using a cross-site scripting filter, wherein disabling the malicious executable scripting code prevents the malicious executable scripting code from executing a digital attack;
    determining, by the computer-based system, that the particular post contains a word appearing in a word list;
    removing, by the computer-based system, the word from the particular post prior to inserting the particular post into a web-page displayed by a recipient device of one of the set of recipients;
    inserting, by the computer-based system, the particular post of the subset of the posts into the web-page;
    receiving, by the computer-based system, an indication that the recipient device is within a predefined distance of a location associated with the merchant; and
    sending, by the computer-based system, a notification to the recipient device, the notification containing a link to the web-page.

2. The computer-implemented method of claim 1, wherein disabling, by the computer-based system, the malicious executable scripting code embedded in the particular post in the subset of the posts further comprises removing the malicious executable scripting code embedded in the particular post.

3. The computer-implemented method of claim 1, further comprising:
    determining, by the computer-based system, that a user-specific preference associated with the recipient device indicates that words in the word list should be filtered from the particular post; and removing, by the computer-based system, the word from the particular post is based at least in part on determining that the user-specific preference indicates that the words in the word list should be filtered from the particular post.

4. The computer-implemented method of claim 1, further comprising:

identifying, by the computer-based system, an expiration date associated with at least one post in the subset of the posts;

determining, by the computer-based system, that a current date is later than the expiration date; and removing, by the computer-based system, the at least one post from the subset of the posts in response to determining that the current date is later than the expiration date.

5. The computer-implemented method of claim 1, wherein the web-page displayed by the recipient device is associated with a competitor of the merchant.

6. The computer-implemented method of claim 1, wherein the social media post includes a map link, wherein upon activation, the map link causes a location of the merchant to be displayed on a map.

7. A system, comprising:

a computing device comprising a processor and a memory;

machine-readable instructions stored in the memory that, when executed by the processor, cause the computing device to at least:

obtain a plurality of posts associated with a merchant from a first social media operator and a second social media operator;

identify a request to distribute a social media post from the plurality of posts to a recipient group based at least in part on the social media post comprising a subject tag for the merchant, the social media post having been published by the first social media operator or the second social media operator;

filter a subset of the posts from the plurality of posts according to a common preference in response to the request to distribute the social media post;

delete a first duplicative post with the subject tag from the subset of the posts based at least in part on the first duplicative post being received from the first social media operator and a second duplicative post with the subject tag being received from the second social media operator;

identify a set of recipients for the recipient group based at least in part on the subject tag, wherein individual recipients in the set of recipients share the common preference;

disable malicious executable scripting code embedded in a particular post in the subset of the posts by using a cross-site scripting filter, wherein disabling the malicious executable scripting code prevents the malicious executable scripting code from executing a digital attack;

determine that the particular post contains a word appearing in a word list;

remove the word from the particular post prior to inserting the particular post into a web-page displayed by a recipient device of one of the set of recipients;

insert the particular post in the subset of the posts into a web-page;

receive an indication that the recipient device is within a predefined distance of a location associated with the merchant; and send a notification to the recipient device, the notification containing a link to the web-page.

8. The system of claim 7, wherein the machine-readable instructions that cause the computing device to disable the malicious executable scripting code embedded in the particular post further cause the computing device to remove the malicious executable scripting code embedded in the particular post.

9. The system of claim 7, wherein the machine-readable instructions, when executed by the processor, further cause the computing device to at least:

determine that a user-specific preference associated with the recipient device indicates that words in the word list should be filtered from the particular post; and remove the word from the particular post is based at least in part on determining that the user-specific preference indicates that the words in the word list should be filtered from the particular post.

10. The system of claim 7, wherein the machine-readable instructions, when executed by the processor, further cause the computing device to at least:

identify an expiration date associated with at least one post in the subset of the posts;

determine that a current date is later than the expiration date; and remove the at least one post from the subset of the posts in response to determining that the current date is later than the expiration date.

11. The system of claim 7, wherein the web-page displayed by the recipient device is associated with a competitor of the merchant.

12. The system of claim 7, wherein the social media post includes a map link, wherein upon activation, the map link causes a location of the merchant to be displayed on a map.

13. A non-transitory, computer-readable medium comprising machine-readable instructions that, when executed by a processor, cause a computing device to at least:

obtain a plurality of posts associated with a merchant from a first social media operator and a second social media operator;

identify a request to distribute a social media post from the plurality of posts to a recipient group based at least in part on the social media post comprising a subject tag for the merchant, the social media post having been published by the first social media operator or the second social media operator;

filter a subset of the posts from the plurality of posts according to a common preference in response to the request to distribute the social media post;

delete a first duplicative post with the subject tag from the subset of the posts based at least in part on the first duplicative post being received from the first social media operator and a second duplicative post with the subject tag being received from the second social media operator;

identify a set of recipients for the recipient group based at least in part on the subject tag, wherein individual recipients in the set of recipients share the common preference;

disable malicious executable scripting code embedded in a particular post in the subset of the posts by using a cross-site scripting filter, wherein disabling the malicious executable scripting code prevents the malicious executable scripting code from executing a digital attack;

determine that the particular post contains a word appearing in a word list;

remove the word from the particular post prior to inserting the particular post into a web-page displayed by a recipient device of one of the set of recipients;

insert the particular post in the subset of the posts into the web-page displayed by a recipient device;

receive an indication that the recipient device is within a predefined distance of a location associated with the merchant; and send a notification to the recipient device, the notification containing a link to the web-page.

14. The non-transitory, computer-readable medium of claim 13, wherein the machine-readable instructions that cause the computing device to disable the malicious executable scripting code embedded in the particular post further cause the computing device to remove the malicious executable scripting code embedded in the particular post.

15. The non-transitory, computer-readable medium of claim 13, wherein the machine-readable instructions, when executed by the processor, further cause the computing device to at least:

determine that a user-specific preference associated with the recipient device indicates that words in the word list should be filtered from the particular post; and remove the word from the particular post is based at least in part on determining that the user-specific preference indicates that the words in the word list should be filtered from the particular post.

16. The non-transitory, computer-readable medium of claim 13, wherein the common preference comprises at least one of a geographic location, an industry category, or an offer type.

* * * * *